April 14, 1936.　　　　C. G. OLSON　　　　2,037,586
LOCKING MEANS FOR THREADED ELEMENTS
Filed June 27, 1934　　　　4 Sheets-Sheet 3
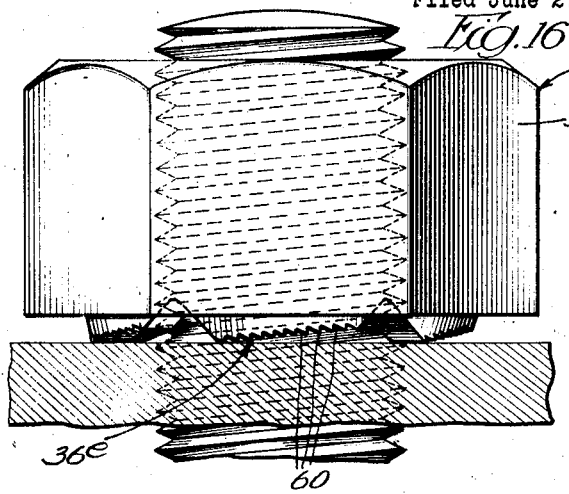
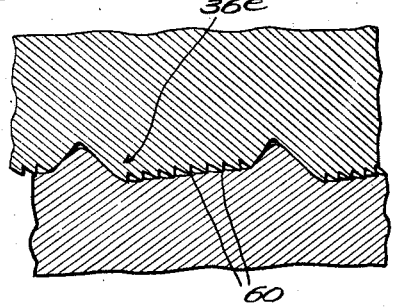
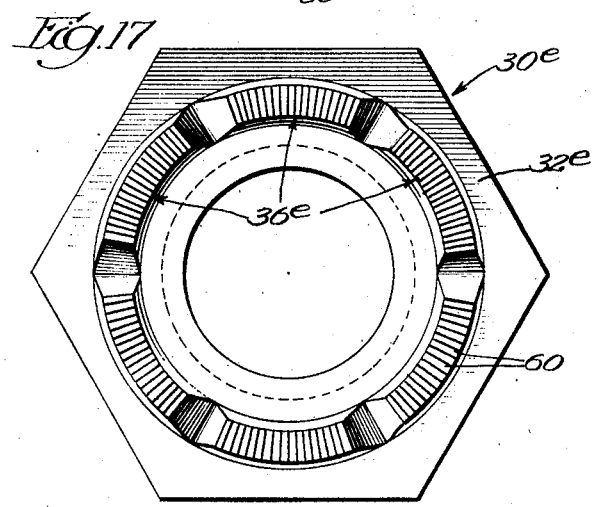
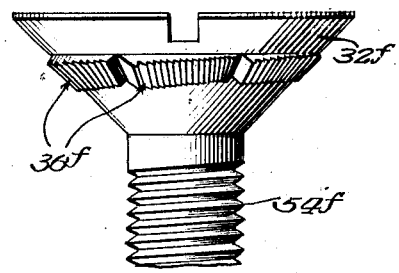
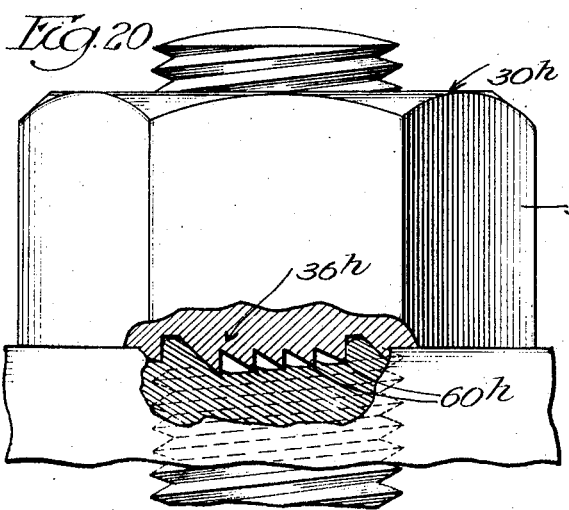
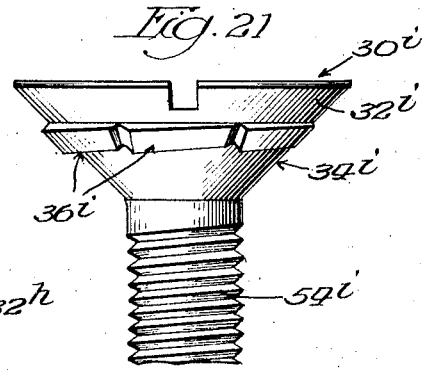
Inventor
Carl G. Olson
By: Cox x Moore Attys

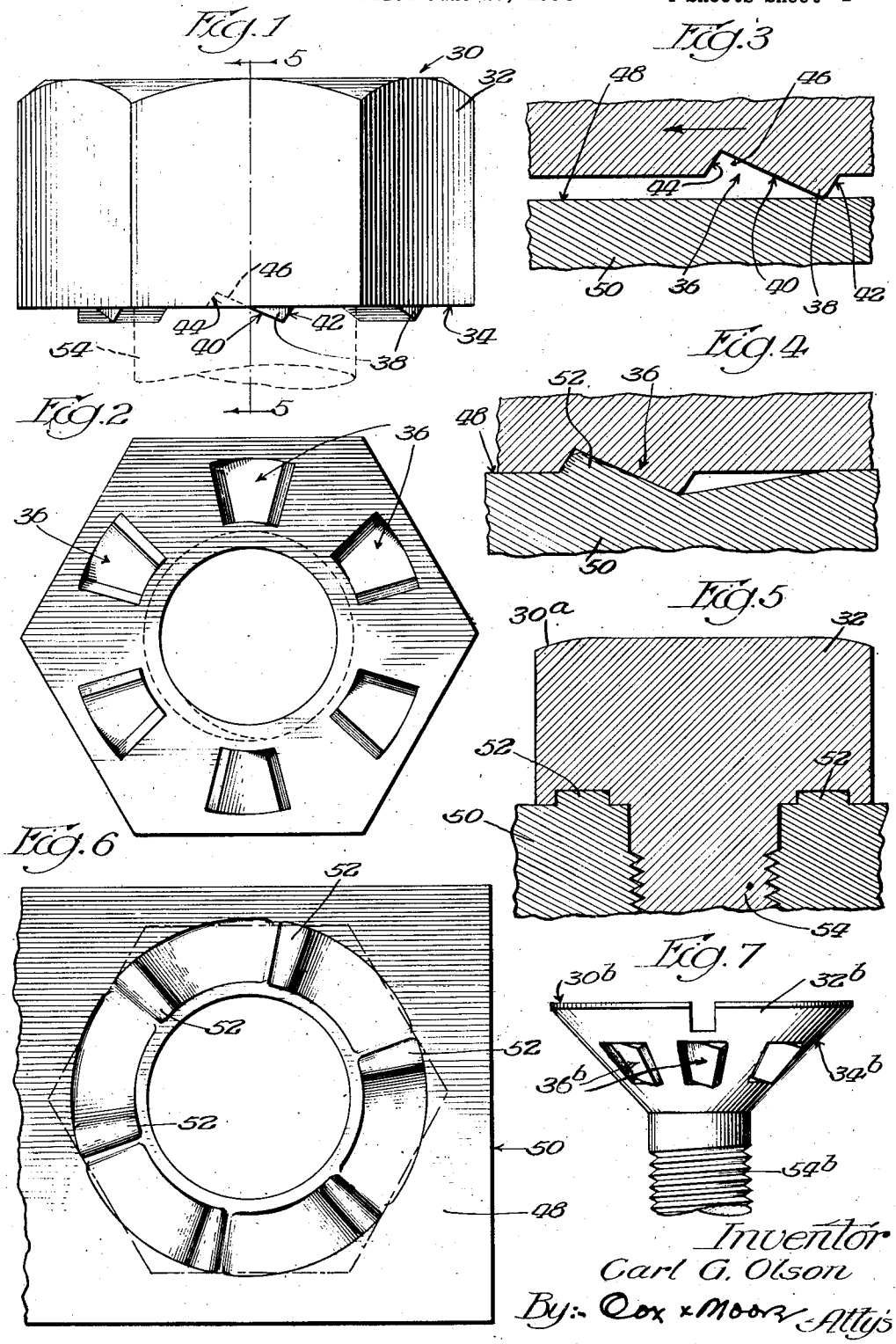

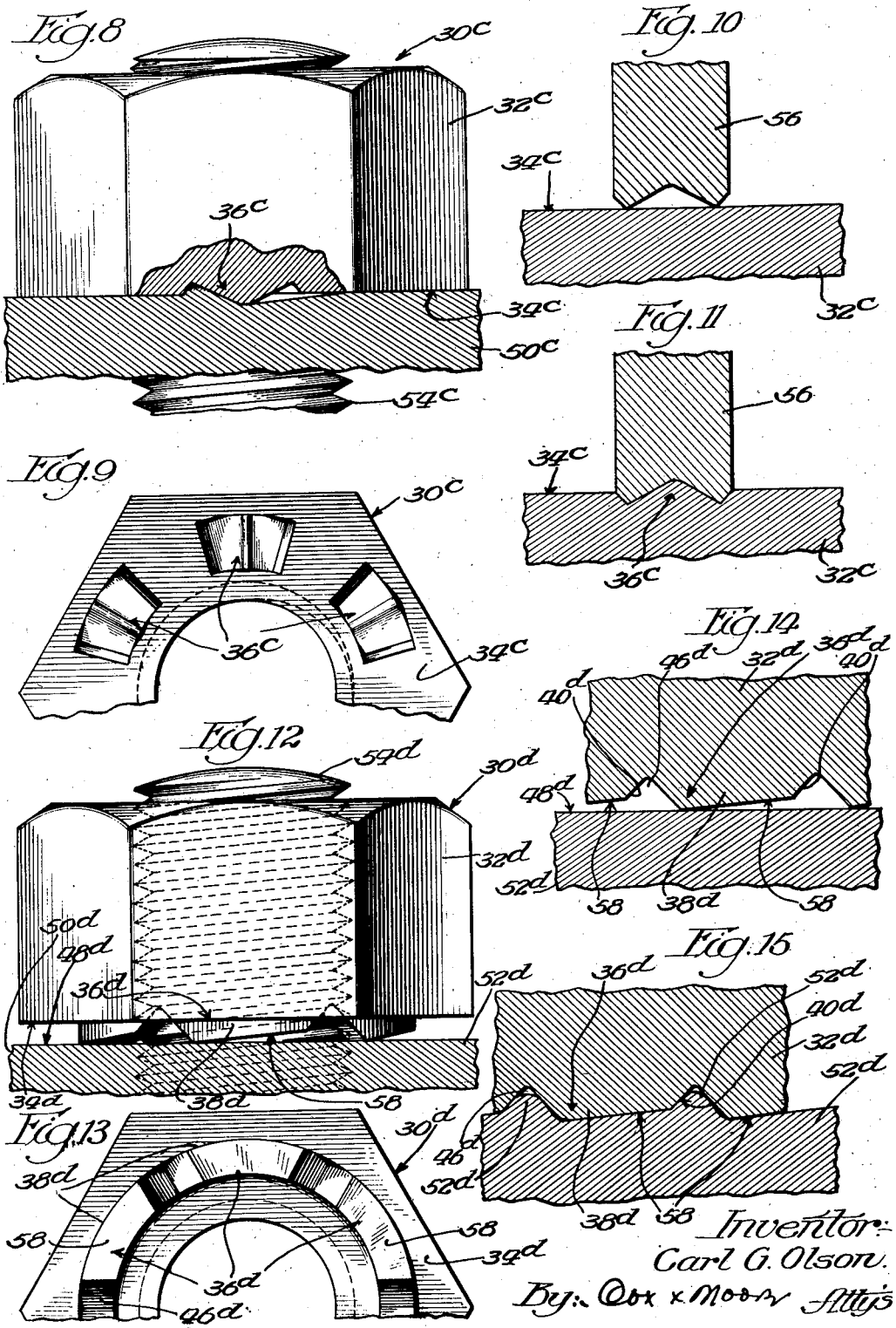

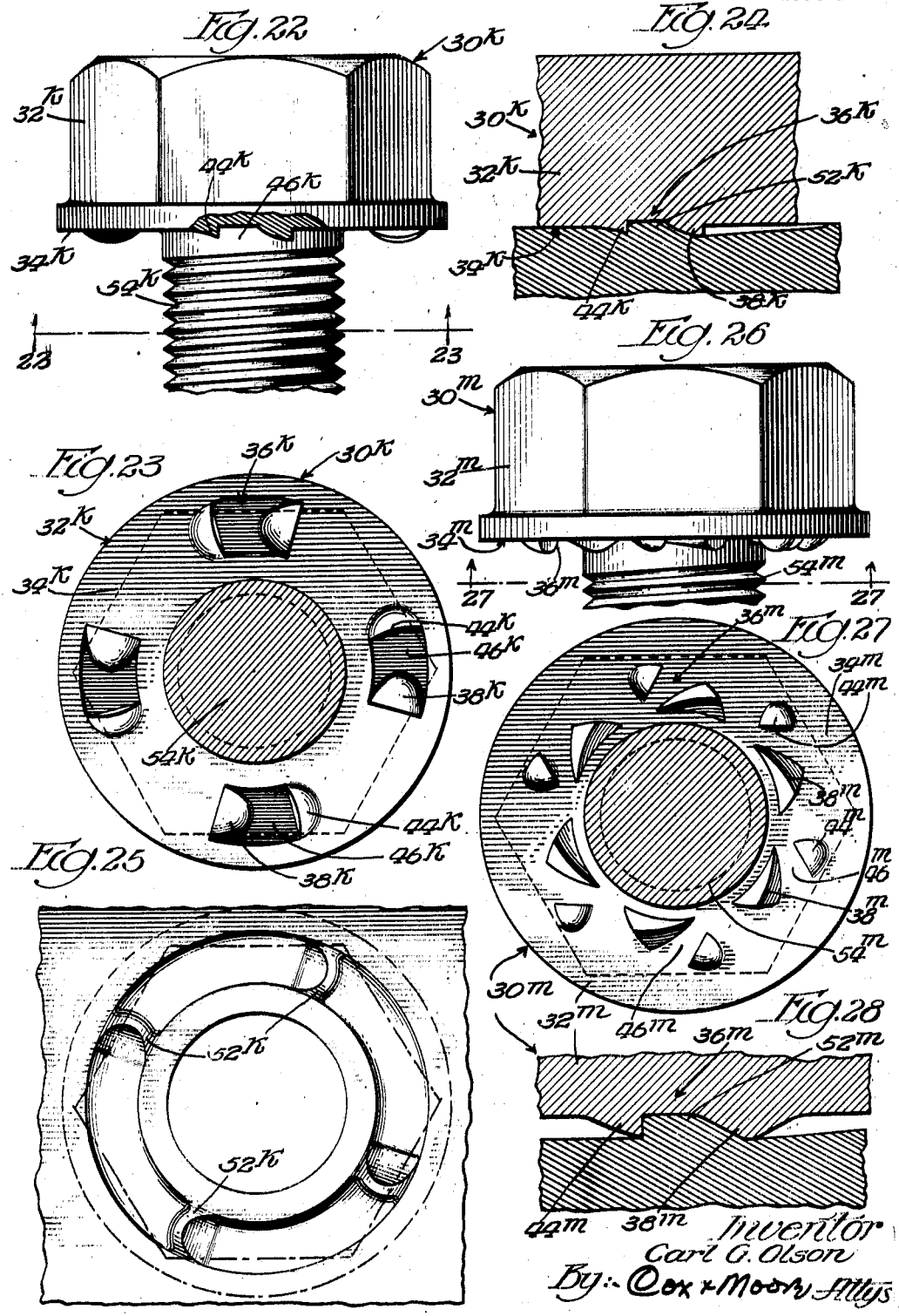

Patented Apr. 14, 1936

2,037,586

UNITED STATES PATENT OFFICE 2,037,586

LOCKING MEANS FOR THREADED ELEMENTS

Carl G. Olson, Chicago, Ill., assignor to Illinois Tool Works, Chicago, Ill., a corporation of Illinois Application June 27, 1934, Serial No. 732,577

20 Claims. (Cl. 151—35)

This invention relates generally to locking or fastening devices, and more particularly to such devices as locking nuts, screws, bolt heads and the like.

I am aware that efforts have heretofore been made to produce self-locking nuts, screws and the like with the view of avoiding the necessity of employing auxiliary fastening devices such as lock washers. In fact, as early as 1869, as evidenced by the patent to Smith, No. 87,717, nuts and bolt heads were provided with ratchet teeth. However, ratchet teeth of the type shown in this early patent, and of the type disclosed in other patents with which I am familiar, have not proven practical in use, and it is an object of the present invention to provide locking devices which not only present a distinct improvement over the prior devices with which I am familiar, but which also have practical application in the field. To this end, I have designed a locking or securing arrangement which is readily adaptable to standard forms of nuts, bolt heads, screws and the like, it being only necessary to slightly configurate the clamping surfaces of said devices to render the same self-locking when applied to a work piece, and thus avoid the necessity of employing an auxiliary fastening element such as a lock washer.

One of the difficulties incident to the use of lock nuts which has come to my attention, and particularly lock nuts equipped with locking or ratchet teeth as referred to above, is that when the teeth engage a work piece, the clamping force exerted by the nut or screw head is not sufficient to cause the teeth to effectively imbed themselves within the work piece. The mere presence of a plurality of teeth on the underside of a screw head or nut, without giving due regard to the clamping force experienced by the nut or screw head when in use, has, in my opinion, been one of the factors which has precluded the commercial or practical application of those devices in the field. For example, if locking elements or teeth are distributed along the clamping surface and the force required to firmly clamp the device against the work is in excess of that which is normally required to tighten a conventional nut or screw head in place, serious disadvantages may be encountered. Thus, an excessive clamping force exerted by a nut or screw head may have a tendency to stretch the shank of the bolt or screw beyond its normal degree of elasticity. Furthermore, excessive clamping forces may also cause shearing or breaking of bolt and screw shanks.

My invention contemplates the provision of devices such as nuts and screw heads equipped with locking elements which will, in response to clamping forces well within the limits of safety, firmly imbed themselves within a work piece and positively secure the device against retrograde movement. In fact, my invention contemplates not only firmly imbedding locking teeth in a work piece, but also contemplates shifting or flowing the metal of the work piece to an extent which will present a firm abutment, to thereby secure the locking device in place without any possibility of the development of backlash.

Conventional locking devices having work-engaging teeth, to which I have made mention above, present the serious difficulty of backlash. That is to say, when such devices are clamped against a work piece, the slight indentation made by the teeth in the surface of the work is not sufficient, after the parts have been subjected to any appreciable vibration, to prevent the nut from unscrewing. This results from the fact that even though the locking elements or teeth develop a burr in the surface of the work, this burr will permit considerable retrograde movement of the nut or screw head before it will present an abutment for the next adjacent ratchet tooth. My invention contemplates overcoming this difficulty by providing the clamping surface of a nut or screw head with teeth which are so disposed and arranged as to cause a shifting or flowing of the metal in front of the teeth into positive engagement with a complementary or companion abutment surface positioned in advance of said teeth. In other words, I propose to correlate the number, size and arrangement of locking elements on the clamping surface of a nut or screw head so as to not only insure the imbedding of the elements within the surface of the work piece when the final clamping force is exerted, but also to cause the metal of the work piece, which is shifted during said final clamping operation, to be positioned into engagement with the above-mentioned abutment.

A further object of this invention is to provide a clamping device having locking elements distributed along the clamping surface thereof in a manner to cause the flowing of material in the work piece without experiencing an actual severance of stock. Further, this flowing of the material is such as to substantially fill a recess or area provided at the trailing side of an abutment surface and thereby present a firm or positive abutment or locking section to prevent retrograde movement of the nut or screw head.

The foregoing and numerous other objects and advantages will be more apparent from the following detailed description when considered in connection with the accompanying drawings wherein—

Fig. 1 is a side elevational view of a standard hexagonal nut equipped with locking features which are representative of one embodiment of the invention, dotted lines in said figure indicating the position of a bolt shank in the event that the invention is to be employed on a bolt head;

Fig. 2 is a plan view of the underside of the nut to Fig. 1;

Fig. 3 is an enlarged schematic sectional view of one of the locking elements shown in initial association with the surface of a work piece, the direction of movement of the locking device or nut being indicated by a directional arrow;

Fig. 4 is a view similar to Fig. 3, disclosing the subsequent position occupied by the locking section of the nut after it has been firmly clamped against the work piece, said view being shown to more clearly illustrate the manner in which the metal of the work piece is caused to flow into engagement with the abutment on the nut;

Fig. 5 is a central, transverse, sectional view taken through a bolt along the line 5—5 of Fig. 1, after the bolt head has been firmly clamped against the work piece, this figure being disclosed to more thoroughly illustrate the manner in which the material of the work piece is caused to flow into engagement with the abutment on the bolt head or nut;

Fig. 6 is a plan view of the work piece to illustrate more clearly the manner in which the surface of the work piece is configurated in response to the action of the locking sections on the head or nut, the position of the head or nut being indicated by dotted lines;

Fig. 7 is a fragmentary elevational view of a screw having the head thereof equipped with locking sections or elements corresponding with those shown in Figs. 1 to 5, inclusive;

Fig. 8 is a side elevational view, shown partly in section, of a standard hexagonal nut equipped with a modified locking section;

Fig. 9 is a fragmentary plan view of the underside of the nut of Fig. 8;

Figs. 10 and 11 disclose the manner in which the locking sections on the nut in Figs. 9 and 10 may be produced, Fig. 10 disclosing the initial association of a tool with the surface of the nut, and Fig. 11 the final position occupied by the tool after it has been forced into the surface of the nut, thereby causing the formation of a locking section;

Fig. 12 is a side elevational view of a standard nut equipped with locking sections of modified form;

Fig. 13 is a fragmentary plan view of the underside of the nut disclosed in Fig. 12;

Figs. 14 and 15 disclose successive positions occupied by the clamping section of the nut of Figs. 12 and 13 during the final clamping thereof;

Fig. 16 is a side elevational view of a conventional or standard nut equipped with locking sections of modified construction, said sections being somewhat similar to the locking sections shown in Figs. 12 to 15 inclusive;

Fig. 17 is a plan view of the underside of the nut of Fig. 16;

Fig. 18 is a fragmentary sectional view disclosing the manner in which the locking sections of the nut of Figs. 16 and 17 imbed themselves within a work piece during the final clamping of the nut;

Fig. 19 discloses a screw with the head thereof provided with locking sections similar to those shown in Figs. 16 to 18 inclusive;

Fig. 20 is a further modified locking section shown in association with a standard nut;

Fig. 21 discloses the manner in which the locking sections of Figs. 12 to 15 inclusive may be incorporated in the head of a conventional screw;

Fig. 22 is a locking device or screw having the head thereof equipped with modified locking sections in the form of projections extending axially of the clamping surface of the screw head;

Fig. 23 is a plan sectional view taken substantially along the line 23—23 of Fig. 22;

Fig. 24 is a fragmentary sectional view disclosing the manner in which the metal is caused to flow and thus lock the screw head of Fig. 22 against retrograde movement;

Fig. 25 is a plan view of a work piece against which the screw head of Fig. 22 has been clamped, said screw head being removed for the purpose of disclosing the structure otherwise hidden, dotted lines in said figure indicating the position occupied by the screw head;

Fig. 26 is a side elevational view of a screw having the head thereof configurated with a still further modified group of locking sections;

Fig. 27 is a plan sectional view of the screw in Fig. 26 taken substantially along the line 27—27 of Fig. 26; and Fig. 28 discloses the manner in which the locking sections of the screw head in Fig. 26 cause the metal in the work piece to flow into locking engagement therewith.

Referring now to the drawings more in detail, wherein like numerals have been employed to designate similar parts throughout the various figures, it will be seen that one embodiment of the invention, as disclosed in Figs. 1 to 6 inclusive, contemplates a locking device designated generally by the numeral 30, having the form of a conventional nut or bolt head 32. The clamping surface 34 is provided with what I prefer to designate as a plurality of locking sections 36. Each of the locking sections 36 in this particular embodiment includes a metal shifting or flowing element or projection 38 which extends beyond the clamping surface 34. It will be noted that each element or projection 38 is bounded by surfaces 40 and 42, the surface 40 I prefer to designate as the advancing surface and the surface 42 as the trailing surface. The reason for this designation will be apparent when it is understood that as the device 30 is turned in the direction indicated by the arrow in Fig. 3, the surface 40 will be in advance of the trailing surface 42. The surface 40 is slightly inclined with respect to the clamping surface 34 and terminates at a locking or abutment surface 44. In the embodiment shown in Figs. 1 to 5 inclusive, the abutment surface or section 44 actually extends into the body of the nut 32. In other words, it may be said that the surfaces 40 and 44 converge within the body of the nut so as to form a depression or indentation 46, as indicated in Figs. 1 and 3. Mention is made of this feature, inasmuch as I have shown in other figures (later to be described) constructions in which an abutment surface is provided without indenting the clamping surface of the nut.

Particular attention is directed to the fact that by having the abutment surface or section 44 positioned within the body of the nut, I am able to effect a firm clamping engagement of the nut surface 34 with the surface 48 of a work piece 50. That is to say, the arrangement of the locking sections 36 is such as to enable each surface 40 to flow a section 52 of the work surface into the recess 46 and into engagement with the abutment surface or section 44, and at the same time permit the positive clamping engagement of the surface 34 with the surface 48. This is a functional characteristic not present in other locking devices of this general class with which I am familiar.

In addition to permitting firm clamping engagement of the surfaces 34 and 48, the above described arrangement also causes the locking or digging elements 38 to be completely hidden from view after the clamping surface 34 has been tightened against the surface 48. This gives the same dressed or finished external appearance to the nut 32 as is present in standard or conventional nuts.

An important characteristic of the locking device just described is that of urging or flowing the work material or section 52 thereof into positive engagement with the abutment surface 44. It will be seen that the size, arrangement, and disposition of the locking section 36 are such that the material in the surface 48 will actually shift or flow into engagement with its companion abutment surface 44 as distinguished from locking devices of known design, wherein teeth, such as a plurality of ratchet teeth, merely dig into the work surface and possibly cause the development of small burrs. These burrs do not shift into engagement with an abutment surface as described above. Hence no provision is made to take care of backlash, and, even though the burrs would be of sufficient height to counteract retrograde movement of the nut within certain limits, the slightest vibration or shock causes the nut to loosen because of the presence of backlash. In my locking device, backlash is positively precluded because the section 52, during the final clamping action of the nut, flows into engagement with the abutment surface 44.

I have designed and distributed my locking section 36 along the clamping surface 34 in such a manner that the complete imbedding of the elements 38, the complete flowing or shifting of the section 52 into the recess 46 and into engagement with the abutment section 44, and the final or complete clamping of the surface 34 against the surface 48 take place without subjecting either the nut or threaded shank 54 to abnormal stresses and strains. Obviously, if the above described flowing and locking actions could only be accomplished by subjecting the associated parts to deleterious strains and stresses, the locking device would have little or no practical value. In fact, one of the problem which I have been confronted with in developing my present invention is that of correlating the arrangement of the locking sections 36 with the clamping force to which the nut or screw may be safely subjected. The clamping or tightening load experienced by the nut is distributed to the elements 38, and this load on each element is sufficient to cause the effective or efficient functioning thereof in the manner previously described.

It will also be apparent that the sections 52 present rigid, firm abutments or projections. In other words, the sections of the work surface acted upon by the elements 38 are not separated or torn from the main body of the work, but are merely shifted, plowed, or "heaved up" without actually severing or cutting the work surface. In this manner the effective locking strength of the sections 52 is maintained. In Figure 6 I have shown a plan view of the work piece after the locking device or nut has been removed, to more clearly indicate the plowing, shifting, or heaving action mentioned.

Obviously, to function efficiently, the elements 38 which dig into and cause the flowing of the metal of the work piece, should be harder than said work piece. This can be accomplished by subjecting the locking device or nut to a hardening treatment after the locking sections have been embodied therein.

In Figure 5 I have disclosed the manner in which the invention just described may be applied to a locking device 30a, in the nature of a conventional threaded bolt, including the previously mentioned shank 54 and a bolt head 32a.

Figure 7 discloses a locking or fastening device or screw 30b. The clamping surface 34b of the conical head 32b is provided with a plurality of locking sections 36b, which are similar in functional and structural characteristics to the locking sections 36 hereinbefore described.

In Figures 8 and 9 I have shown a modified arrangement of locking sections, which are designated generally by the numeral 36c. These sections 36c are embodied in a locking device 30c in the form of a conventional nut 32c, said nut being shown in operative association with a threaded shank 54c and a work piece 50c.

It will be noted that the left half of the locking section 36c (as viewed in Figure 8) is practically identical in structural and functional characteristics with the locking sections 36 previously described. The difference resides in the provision of a symmetrical right half (as indicated clearly in Figures 8 and 9). This type of locking may be embodied within the flat clamping surface of conventional standard nuts, screw heads, and the like in the manner shown in Figures 10 and 11. A tool 56 shaped at its lower extremity as a counterpart of the locking section 36c of Figures 8 and 9, is brought into engagement with the flat clamping surface 34c of the standard nut 32c and driven to the depth shown in Figure 11. The central or intermediate element 38c developed by the tool 56 corresponds with the element 38 of Figures 1 to 4, inclusive. The nut 32c is subsequently hardened or tempered. The locking sections 36c are adapted for use on either right or left-hand nuts or screws.

In Figures 12 to 15, inclusive, I have disclosed another modification of the section, said section being indicated generally by the numeral 36d. These sections 36d are shown in association with a locking device 30d having the form of a conventional or standard nut 32d, which has a clamping surface 34d. The nut 32d is mounted upon a threaded shank 54d, and in Figure 12 is shown in a position about to be finally tightened against the surface 48d of a work piece 50d.

Each of the locking sections 36d includes an element 38d, which corresponds functionally and structurally with the previously mentioned elements 38. Particular attention, however, is directed to the fact that the elements 38d are each provided with a clamping surface 58. As shown in Figure 12, these surfaces 58 are inclined to the clamping surface 34d of the nut 32d, said angle of inclination corresponding with the pitch angle of the threads on the shank 54d. In other words, the surfaces 58 are arranged in parallelism with the thread helix of the shank 54d. This arrangement of the clamping surfaces 58 increases the self-locking effectiveness of the nut 32d.

Referring to Figures 14 and 15, it will be seen that as the nut 32d is rotated from the position in Figure 14 to the position in Figure 15, a section 52d is caused to flow into a recess 46d and into locking engagement with an abutment surface 40d. In this respect, the locking sections 36d function in the same manner as the sections 36. It will be noted, however, that in addition to the locking action of the abutment 40d and the section 52d, the surfaces 58 clampingly engage the complementary surfaces of the work piece, and thus afford this additional force in opposition to forces which have a tendency to cause retrograde movement of the nut 32d. Furthermore, the surfaces 58 remain in clamping engagement with the work piece, even though the nut 32d should experience retrograde movement. In other words, because of the parallel relationship between the surfaces 58 and the thread helix of the shank 54d, the surfaces 58 do not move away from the complementary surfaces of the work piece as the nut is initially moved in a reverse or retrograde direction.

In Figures 16 to 18, inclusive, a locking device 30e in the form of a standard nut 32e is shown having locking sections 36e, which are very similar to the locking sections 36d, just described. In fact, the locking sections 36e differ only in that they are provided with serrations or corrugations 60 instead of the plain clamping surfaces 58 of Figures 12 to 15, inclusive. The serrations function to more aggressively resist forces tending to impart retrograde movement to the nut. It will be noted that the serrations 60 extend in substantial parallelism with the thread helix, and hence maintain their aggressiveness, even though the nut may be partially unscrewed.

Figure 19 discloses a locking device 30f in the form of a screw. The head 32f, connected with the shank 54f is provided with locking sections 36f, which are functionally and structurally similar to the locking sections 36e just described.

Figure 20 discloses a locking or fastening device 30h in the form of a standard nut 32h. The nut 32h is provided with a plurality of locking sections 36h, which are quite similar to the locking sections 36e and 36f. The only difference in structure is that the locking sections 36h are formed with teeth 60h of larger size.

In Figure 21 I have disclosed the manner in which the structure disclosed in Figures 12 to 15, inclusive, may be embodied in a conical head screw. The locking or fastening device of Figure 21 is designated generally by the numeral 30i. This device includes a head 32i, a threaded shank 54i, and a plurality of locking sections 36i distributed along the clamping surface 34i.

Figures 22 to 24, inclusive, disclose fastening devices 30k comprising a screw head 32k having a clamping surface 34k and connected with an integral threaded shank 54k. Modified locking sections 36k are distributed along the surface 34k and include elements 38k corresponding to elements 38, recesses 46k, and abutment sections 44k. The abutment sections 44k differ in that they actually project beyond the clamping surface 34k. They project to a lesser extent than the elements 38k. In Figure 24 I have shown how the elements 38k function to cause metal to flow into the recesses 46k and into engagement with the abutment sections 44k.

Figure 25 more clearly indicates the manner in which the flowing or shifting of the metal in the work piece takes place. Sections 52k flow into the recesses 46k.

Still another embodiment of my invention is shown in Figures 26 to 28, inclusive. A fastening device 30m comprises a head 32m and a threaded shank 54m. Modified locking sections 36m are provided along the clamping surface 34m, each section including an element 38m and a smaller abutment element or section 44m. The elements 38m are spirally disposed, and as they are forced into the surface 48m of a work piece 50m, metal is caused to flow in front of the smaller sections 44m. In this manner the space 46m between the elements 38m and 44m is filled by a section 52m, as clearly shown in Figure 28.

It might be said that the elements 38m plow their way into the work, and in so doing, cause metal to be disposed on each side of the furrow which it makes. The metal flowing toward the section 44m provides an effective locking abutment.

The locking devices are preferably hardened, that is, the material from which the locking device is made, is harder than the work piece upon which the locking device operates.

From the foregoing it will be apparent that my invention contemplates improved means whereby fastening devices may be rendered more effective for their intended purpose. It will also be appreciated that the invention contemplates the provision on standard or conventional fastening devices, such as nuts, bolt heads, screws, and the like, means for positively securing such devices against loosening without the use of auxiliary fastening elements such as lock washers. Obviously the invention is not limited to the specific embodiments disclosed herein, but contemplates other modifications and changes without departing from the spirit and scope of the appended claims.

The subject matter of Figures 26 to 28, inclusive, is claimed generically but not specifically herein, specific claims to this subject matter being presented in my copending application Serial No. 40,465, filed September 13, 1935.

Having thus described my invention, what I claim as new and desire to secure by Letters Patent is:

1. A rotary fastener adapted to be clamped against the surface of a work piece, including a rotary threaded body, and a locking section on said body including an abutment section and an element adapted in response to rotary tightening movement experienced by the body to cause a section of the work piece positioned laterally outward of the threaded portion of said body to be shifted into locking association with said abutment section whereby to prevent loosening of the fastener.

2. A rotary fastener adapted to be clamped against the surface of a work piece, including a rotary threaded body, and a plurality of locking sections on said body disposed about the axis thereof, each locking section including an abutment section and an element adapted in response to rotary tightening movement experienced by the body to cause a section of the work piece positioned laterally outward of the threaded portion of said body to be shifted into locking association with said abutment section whereby to prevent loosening of the fastener.

3. A rotary fastener adapted to be clamped against the surface of a work piece, including a rotary threaded body having a clamping surface, and a locking section on said body including an abutment section extending inwardly of said clamping surface and an element adapted in response to rotary tightening movement experienced by the body to cause a section of the work piece to be shifted into locking association with said abutment section whereby to prevent loosening of the fastener.

4. A rotary fastener adapted to be clamped against the surface of a work piece, including a rotary threaded body, and a locking section on said body including an abutment section and an element extending axially beyond said abutment section and adapted in response to rotary tightening movement experienced by the body to cause a section of the work piece positioned laterally outward of the threaded portion of said body to be shifted into locking association with said abutment section to prevent loosening of the fastener.

5. A rotary fastener adapted to be clamped against the surface of a work piece including a rotary threaded body having a clamping surface, and a plurality of annularly disposed locking sections, each locking section including an abutment section and an element adapted in response to rotary tightening movement experienced by the body to cause a section of the work piece to shift into association with said abutment section, said locking sections being constructed and arranged to permit complete shifting of the work piece section as the clamping surface of the body is tightened against the work piece.

6. A rotary fastener adapted to be clamped against the surface of a work piece, including a rotary threaded body having a clamping surface, a plurality of elements projecting axially beyond said clamping surface and adapted to cause shifting of a section of said work piece in response to rotary tightening movement experienced by the body, and abutment means adapted to engage the shifted section of the work piece, said elements and abutment means being so constructed and arranged as to enable the clamping surface of the body to be tightened against the work piece without subjecting the associated parts to abnormal stresses.

7. A rotary fastener adapted to be clamped against the surface of a work piece, including a rotary threaded body having a clamping surface, a plurality of elements projecting axially beyond said clamping surface and adapted to cause shifting of a section of said work piece in response to rotary tightening movement experienced by the body, and abutment means extending inwardly of said clamping surface adapted to engage the shifted section of the work piece, said elements and abutment means being so constructed and arranged as to enable the clamping surface of the body to be tightened against the work piece without subjecting the associated parts to abnormal stresses.

8. A rotary threaded fastener adapted to be clamped against the surface of a work piece, including a rotary body, and a locking section associated therewith including an element for causing the shifting of a section of the work piece in response to rotary movement experienced by said body, a clamping surface positioned in the vicinity of said element extending in substantial parallelism with the helix of the thread on the fastener whereby to increase the self-locking effectiveness of the fastener.

9. A rotary threaded fastener adapted to be clamped against the surface of a work piece, including a rotary body, and a locking section associated therewith including an element for causing the shifting of a section of the work piece in response to rotary movement experienced by said body, a roughened clamping surface positioned in the vicinity of said element extending in substantial parallelism with the helix of the thread on the fastener whereby to increase the self-locking effectiveness of the fastener.

10. A rotary fastener adapted to be clamped against the surface of a work piece, including a rotary body having a head and threaded shank connected therewith, and a locking section on said head including an abutment section and an element adapted in response to rotary tightening movement experienced by the body to cause a section of the work piece to be shifted into locking association with said abutment section whereby to prevent loosening of the fastener.

11. A rotary fastener adapted to be clamped against the surface of a work piece, including an internally threaded rotary body, and a locking section on said body including an abutment section and an element adapted in response to rotary tightening movement experienced by the body to cause a section of the work piece to be shifted into locking association with said abutment section whereby to prevent loosening of the fastener.

12. A rotary fastener adapted to be clamped against the surface of a work piece, including a rotary body, and a locking section on said body including an abutment section and an element having an inclined surface extending from the body opposite to the direction of rotation adapted in response to rotary movement experienced by the body to cause a section of the work piece to be shifted into locking association with said abutment section whereby to prevent loosening of the fastener.

13. A rotary fastener adapted to be clamped against the surface of a work piece, including a rotary body, and a locking section on said body including an abutment section and an element extending axially beyond said abutment section and having an inclined surface extending from the body opposite to the direction of rotation adapted in response to rotary movement experienced by the body to cause a section of the work piece to be shifted into locking association with said abutment section whereby to prevent loosening of the fastener.

14. The method of securing against retrograde rotation with respect to a work piece, a threaded fastener having a clamping surface extending laterally outward from the threaded portion thereof and an abutment section associated with said clamping surface, which includes the steps of rotating said fastener in a tightening direction, and simultaneously causing a section of the work piece to be shifted into locking association with said abutment section.

15. The method of securing against retrograde rotation with respect to a work piece, a threaded fastener having a clamping surface extending laterally outward from the threaded portion thereof and an abutment section associated with said clamping surface, which includes the steps of rotating said fastener in a tightening direction, and simultaneously causing a section of the work piece to be shifted by cold flowing into locking association with said abutment section.

16. The method of securing against retrograde rotation with respect to a work piece, a threaded fastener having a clamping surface extending laterally outward from the threaded portion thereof and an abutment section associated with said clamping surface, which includes the steps of rotating said fastener in a tightening direction, simultaneously causing a section of the work piece to be shifted into locking association with said abutment section, and finally tightening said clamping surface against the complementary surface of said work piece.

17. The method of securing against retrograde rotation with respect to a work piece, a threaded fastener having a clamping surface extending laterally outward from the threaded portion thereof and an abutment section associated with said clamping surface, which includes the steps of rotating said fastener in a tightening direction, and simultaneously causing a section of the work piece to be shifted in the form of a rigid unsevered mass into locking association with said abutment section.

18. The method of locking together clamping surfaces of relatively rotatable members, which comprises forming a depression and a juxtaposed projection on the surface of one of said members, and relatively rotating said members under pressure whereby to cause the projection of one member to crowd material of the surface of the other member into said depression to thereby interlock said members.

19. The method of locking together clamping surfaces of relatively rotatable members, which comprises forming a depression and a juxtaposed projection on the surface of one of said members, and relatively rotating said members under pressure with the projection trailing the depression, whereby to cause the projection on one surface to crowd the material of the other surface in said depression to thereby interlock said members.

20. The method of preventing retrograde rotation of a clamping member with respect to a work piece, which comprises pushing metal in an unsevered rigid mass from the work piece and crowding said metal into the confines of the body of the clamping member.

CARL G. OLSON.